United States Patent
Pham et al.

(10) Patent No.: US 12,303,939 B2
(45) Date of Patent: May 20, 2025

(54) METHODS FOR COATING AND COMPONENTS HAVING COATINGS FOR ELECTRICAL CONDUCTIVITY

(71) Applicants: HI-SHEAR CORPORATION, Torrance, CA (US); LISI AEROSPACE, Paris (FR)

(72) Inventors: Haikhanh Pham, Torrance, CA (US); Laurent Bourges, Rancho Palos Verdes, CA (US); Johan Stephan, Houilles (FR)

(73) Assignees: LISI AEROSPACE, Paris (FR); HI-SHEAR CORPORATION, Torrance, CA (US)

( * ) Notice: Subject to any disclaimer, the term of this patent is extended or adjusted under 35 U.S.C. 154(b) by 0 days.

(21) Appl. No.: 18/020,358

(22) PCT Filed: Aug. 2, 2021

(86) PCT No.: PCT/US2021/044232
§ 371 (c)(1),
(2) Date: Feb. 8, 2023

(87) PCT Pub. No.: WO2022/035634
PCT Pub. Date: Feb. 17, 2022

(65) Prior Publication Data
US 2023/0302490 A1    Sep. 28, 2023

Related U.S. Application Data

(60) Provisional application No. 63/064,892, filed on Aug. 12, 2020.

(51) Int. Cl.
*B05D 5/12*    (2006.01)
*B05D 1/02*    (2006.01)
*C25D 3/12*    (2006.01)

(52) U.S. Cl.
CPC ............... *B05D 5/12* (2013.01); *B05D 1/02* (2013.01); *C25D 3/12* (2013.01); *B05D 2202/00* (2013.01); *B05D 2601/10* (2013.01)

(58) Field of Classification Search
CPC ........ B05D 5/12; B05D 1/02; B05D 2202/00; B05D 2601/10; C25D 3/12;
(Continued)

(56) References Cited

U.S. PATENT DOCUMENTS 3,983,304 A * 9/1976 Sekhon ................. F16B 33/008
                                                          427/388.5
4,760,493 A     7/1988 Pearson
(Continued)

FOREIGN PATENT DOCUMENTS

JP         62197473 A  *  9/1987
WO     WO 2005/116379       12/2005

OTHER PUBLICATIONS

Network, n. in OED Second Edition. (Year: 1989).*
(Continued)

*Primary Examiner* — William P Fletcher, III
(74) *Attorney, Agent, or Firm* — Henricks Slavin LLP

(57) ABSTRACT

A metal component made of a base metal and a coating system thereon is characterized in that the coating system comprises a conductive layer on the base metal and a resin-based layer including conductive pigments on the conductive layer. The conductive pigments form electrically conductive 3D-networks in the resin, with the networks being randomly distributed in the resin. Further, a method for coating a metal component is disclosed, and may include depositing a conductive layer on a surface of the component, depositing a resin with electrically conductive pigments on the conductive layer and drying the resin. The coating system may be applied to metal components, including
(Continued)

aerospace fasteners such as pins, bolts, collars, nuts and nut plates, and washers, as well as studs, latches, helicopter rotors, and landing gear structures.

5 Claims, 9 Drawing Sheets

(58) Field of Classification Search
CPC .... F16B 2200/79; F16B 2200/93; F16B 5/02; F16B 25/0021; F16B 1/00; F16B 19/04; F16B 5/0004; F16B 5/04; B64D 45/02; B64D 37/32; B64D 3/26
See application file for complete search history.

(56) References Cited

U.S. PATENT DOCUMENTS

| | | | |
|---|---|---|---|
| 10,640,232 B2 | 5/2020 | Khossravani | |
| 2005/0200136 A1* | 9/2005 | Aisenbrey | H05K 3/101 |
| | | | 292/1 |
| 2011/0014356 A1* | 1/2011 | Fornes | C08G 59/58 |
| | | | 324/72 |
| 2013/0048331 A1* | 2/2013 | Fornes | B64D 45/02 |
| | | | 174/2 |
| 2016/0083109 A1* | 3/2016 | Regnard | F16B 25/0021 |
| | | | 427/299 |
| 2016/0169262 A1* | 6/2016 | Regnard | B64D 45/02 |
| | | | 411/386 |
| 2018/0170576 A1* | 6/2018 | Khosravani | B64D 45/02 |
| 2020/0217349 A1* | 7/2020 | Hansen | F16B 33/004 |

OTHER PUBLICATIONS

Schandel, Yannick, International Search Report, Nov. 3, 2021, 5 pages, European Patent Office, Rijswijk, Netherlands.

Schandel, Yannick, Written Opinion of the International Search Authority, Nov. 3, 2021, 6 pages, European Patent Office, Rijswijk, Netherlands.

* cited by examiner

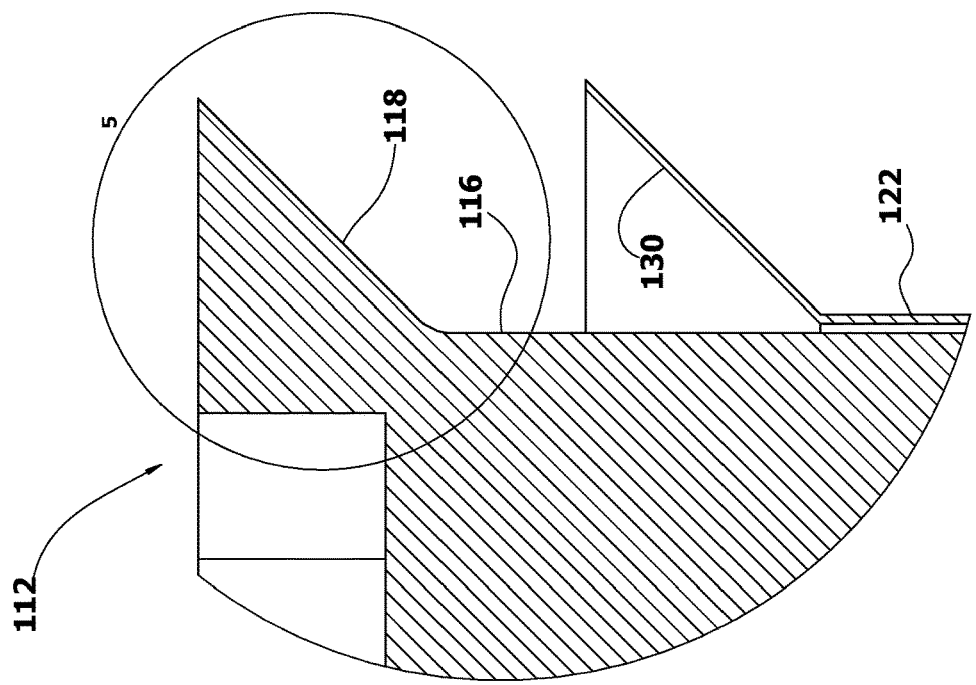
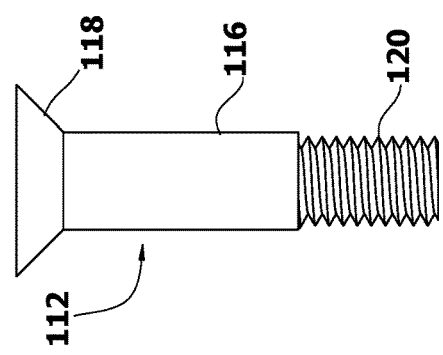
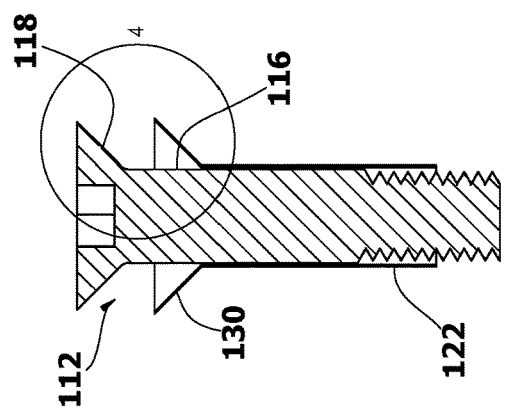
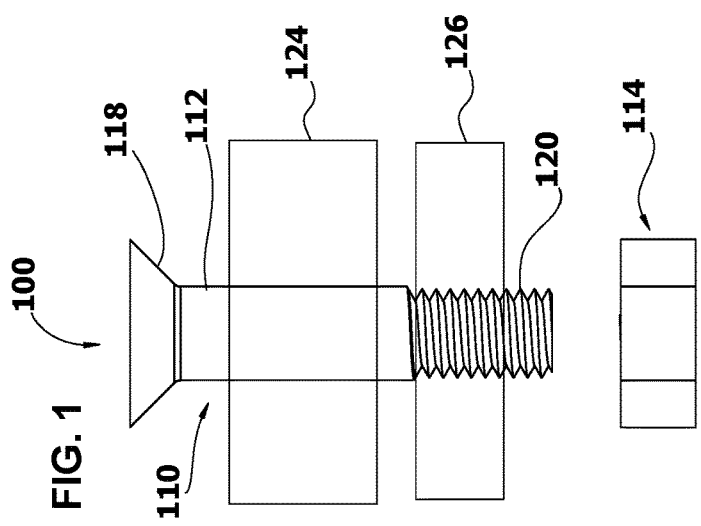

METHODS FOR COATING AND COMPONENTS HAVING COATINGS FOR ELECTRICAL CONDUCTIVITY

CROSS REFERENCE TO RELATED APPLICATIONS

This application is a National Stage of International Application No. PCT/US21/44232, filed Aug. 2, 2021, which claims priority from U.S. 63/064,892 filed Aug. 12, 2020, the entire contents of which are incorporated herein by reference.

BACKGROUND

Field

This disclosure relates to surface treatments for aerospace components, such as fasteners and other components, that offer low coefficient of friction, aid in high interference assembly, and promote electrical conductivity in electrical grounding and electrical bonding applications while offering galvanic corrosion protection in composite and/or metallic joints, paint adhesion and resist chemicals and fluids.

The coatings are applicable to use on a number of different base metals and combinations of metals. They are especially applicable to the coating of titanium and titanium alloys, stainless steels, and superalloys. A particular application relates to titanium fasteners commonly used in the aluminum and/or carbon fiber reinforced polymer (CFRP) structures of aircraft and the like. In an example, the coatings are useful to protect one or both of titanium fasteners and aluminum and/or CFRP structures of the aircraft.

Related Art

It is common practice to assemble aluminum or aluminum alloy structures, such as those of aircraft, with high strength fasteners of titanium or titanium alloys, such as Ti-6Al-4V. In other examples, fasteners of a stainless steel, such as A286, and a nickel-chromium-based superalloy, such as Inconel® 718, have been used. Further, carbon fiber reinforced polymer (CFRP) has been used in place of aluminum-based structures. In some instances, hybrid Al-CFRP structures have been employed.

Various coatings have been used for aerospace fasteners, primarily for corrosion protection. The following is a list of these coatings and their drawbacks:

Ion vapor deposited (IVD) aluminum coating: Relies on chromate for corrosion protection, is not suitable for interference fit applications, does not promote paint adhesion, and is not galvanically compatible with CFRP structures.

Aluminum-pigmented resin-base coating: Has poor electrical conductivity and does not satisfy electrical bonding and electrical grounding requirements.

Cadmium: Relies on chromate for corrosion protection and is not compatible with CFRP structures.

Sulfuric acid anodizing (SAA) on titanium: Is not recommended with aluminum structures, is not suitable for interference fit applications, and does not promote paint adhesion.

A need remains for a coating of aerospace components that is chromate-free, has low electrical resistivity for electrical grounding and electrical bonding applications, and is compliant with environmental agency regulations or requirements.

SUMMARY

Briefly, and in general terms, the present inventions provide for an electrically conductive coating system to be applied to aircraft fasteners and other aerospace components and surfaces and that does not contain chromate. Other aerospace components benefitted by the teachings herein include, but are not limited to, fasteners such as pins, bolts, collars, nuts and nut plates, washers, and studs. Even non-fastener applications, such as latches, helicopter rotors, and landing gear structures, for example, may be benefited by the teachings of the present inventions. The coated aircraft components, for example fasteners, are compatible with aluminum and CFRP structures.

Accordingly, one aspect of the present inventions provides for a coating system for a component made of a base metal. The coating system includes a conductive layer on the base metal, and a resin-based layer including a conductive pigment, layered on the conductive layer.

In one example, the coating system for a metal component made of a base metal includes a metal flash layer on at least part of the metal of the component and a resin-based layer on the metal flash layer, including for example on a titanium aerospace component. In another example, the coating system includes a nickel flash layer between the base metal and the resin-based layer, including for example on a titanium component. In a further example, the coating system includes a metal flash layer on the metal component, and metal fibers in a resin-based layer over the metal flash layer, including for example on a titanium aerospace component. In another example, the coating system includes a metal flash layer on the metal component and a resin-based layer including a conductive pigment over the metal flash layer. In one example of a metal flash layer on the metal component and a resin-based layer including a conductive pigment over the metal flash, the metal used for the metal flash layer and the conductive pigment include the same metal, and in one example, the metal is nickel.

In a further example of a coating system for a metal component made of a base metal, the coating system includes a metal flash layer on at least part of the metal of the component and a pigmented resin-based layer on the metal flash layer. In another example, the coating system for a metal component made of a base metal includes a metal flash layer on at least part of the metal surface of the component, and a resin-based layer on the metal flash layer having a metal pigment, including for example on a titanium aerospace fastener. In one example of such a coating system having a metal flash layer and a metal pigment in a resin-based layer, the two metals are the same, and in another example the two metals are nickel. In a further example of such a coating system having a metal flash layer and a metal pigment in a resin-based layer, the metal pigment is nickel fibers, and in a further example of a metal pigment, the metal pigment is present in a concentration of between about 5% and about 15% by weight of solution before drying, and about 11% by weight is another example. In another example of such a coating system having a metal flash layer and a metal pigment in a resin-based layer, the metal pigment is formed of metal fibers or filaments extending other than normal to a surface of the metal aerospace component, and in a further example, the metal pigment is randomly distributed in the resin-based layer in agglomerations. In any of the foregoing examples of a metal flash layer on the metal component and a resin-based layer including a conductive component over the metal flash, in one example, the metal in the resin-based layer is randomly distributed in 3-dimensional electrically conductive networks.

In another aspect, the component, made of the base metal, includes the coating system thereon, including any of the coating systems described herein. The coating system includes the conductive layer on the base metal, and the resin-based layer including the conductive pigment on the conductive layer.

In yet another aspect, a method for coating the component made of base metal with the coating system is provided, and includes any of the coating systems as described herein. The method includes providing the metal component, depositing the conductive layer on a surface of the metal component, depositing a liquid mixture comprising electrically conductive pigments dispersed in a resin on the conductive layer, and drying the liquid mixture such that the conductive pigments form electrically conductive 3D-networks in the resin, such networks being randomly distributed in the resin.

The present inventions, aspects of which are directed to coating systems containing an organic resin, are different from cadmium, sulfuric acid anodization and pure aluminum vapor deposited coatings because those are pure metallic deposits and do not contain any organic resins. The present inventions provide improved electrical conductivity properties when compared to aluminum pigmented resin-based coatings.

The coating systems of the present inventions are chromate-free and are sufficiently electrically conductive to meet some electrical grounding and electrical bonding applications. They are compatible with full metallic structures and CFRP structures or a combination of both (so-called hybrid structures). They can be used on metal fasteners for interference fit applications.

These and other aspects and advantages of the inventions will become apparent from the following detailed description and the accompanying drawings, which illustrate by way of example the features of the inventions.

BRIEF DESCRIPTION OF THE DRAWINGS

FIG. 1 is a side view of a partially exploded structure in schematic form with a fastener assembly, including a fastener, according to an embodiment consistent with the principles described herein.

FIG. 2 is a side elevation view of a stud of the fastener assembly of FIG. 1.

FIG. 3 is a longitudinal cross-section of the stud of FIG. 1 and a sleeve that alternatively can be used as part of the fastener assembly in FIG. 1, according to an embodiment consistent with the principles described herein.

FIG. 4 is a detail view of a portion of the stud and sleeve of FIG. 3.

DETAILED DESCRIPTION

Figure 5:
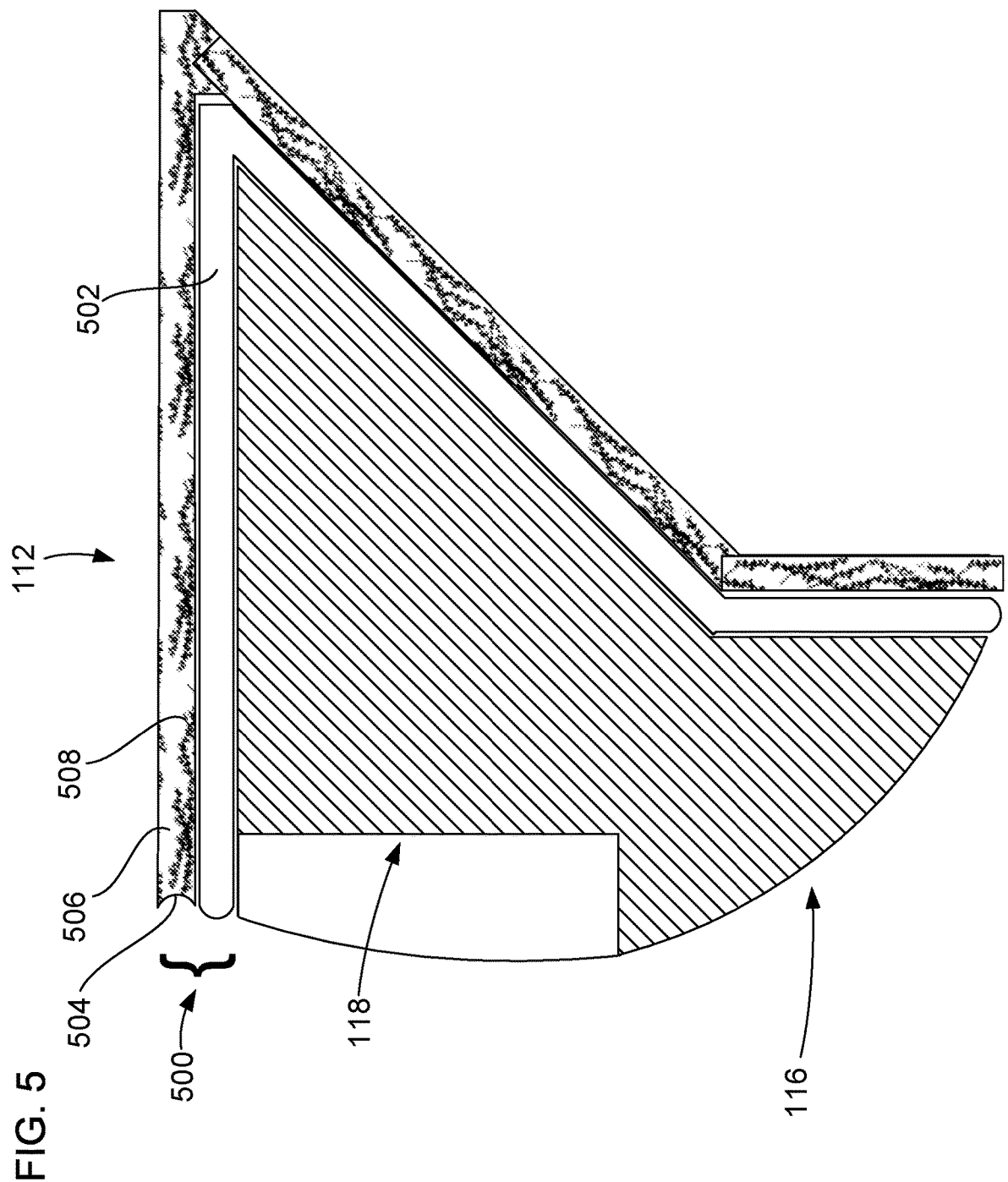
FIG. 5 is a further detail view of the fastener stud of FIGS. 1-4.

As used herein, the articles "a" and "an" are intended to have their ordinary meaning in the patent arts, namely "one or more". For example, "an aerospace component" means one or more aerospace components and as such, "the aerospace component" means "the aerospace component(s)" herein. Also, any reference herein to "top", "bottom", "upper", "lower", "up", "down", "front", "back", "first", "second", "left" or "right" is not intended to be a limitation herein. Herein, the term "about" or "approximately" when applied to a value generally means within the tolerance range of the equipment used to produce the value, such as a layer thickness, or, in the case of a composition, the variance in component amounts due to minor errors in measuring, or may mean plus or minus 10%, unless otherwise expressly specified. Further, the term "substantially", as used herein, means a majority, or almost all, or all, or an amount within a range of about 51% to about 100%. Moreover, examples herein are intended to be illustrative only and are presented for discussion purposes and not by way of limitation.

During design and assembly of aircraft, the OEM may select a surface treatment of fasteners that fulfills several technical functions. Some of these functions may include: low coefficient of friction properties such as to allow low forces in high interference fit fastener insertion and minimize galling, prevent corrosion, promote electrical conductivity, promote external paint adhesion, and/or withstand chemicals and fluids. There is not a current solution that allows for the combination of those properties without the use of chromate and that is compatible with metal or full CFRP (carbon fiber reinforced polymer) or hybrid CFRP/metal structures.

Metallic coating deposits in the past have used chromate for corrosion protection. Chromates are an environmental and health concern as they are a known carcinogen, mutagen and toxic for the reproduction system. Alternative coating systems may be based on organic resins that are electrically insulating by nature but the resin's electrical conductivity can be increased with the addition of metallic pigment. Organic coatings, however, have limitations as to the amount of conductive elements that can be added, due to formulation instability or detrimental impact to other properties such as friction. There are no known industrial pigmented organic resin systems that are electrically conductive and that can meet intended electrical bonding and electrical grounding applications for aerospace fasteners.

To meet electrical grounding and electrical bonding applications, and in accordance with embodiments of principles described herein, the solution disclosed herein is a coating system for an aerospace component that combines a conductive layer and a resin-based layer including a conductive pigment on the conductive layer, as well as the aerospace component having such a coating system thereon. It should be noted that no implication is made that only the first layer is electrically conducting and that the second layer is not electrically conducting. Both layers are electrically conducting, although not necessarily equally so, and coact together to provide a desired electrical resistivity adapted to electrical grounding and/or electrical bonding.

The aerospace component can be any of the aerospace components listed above, including fasteners, for example. The aerospace component may comprise a metal selected from the group consisting of titanium or titanium alloy, such as Ti-6Al-4V, a stainless steel, such as A286, and a nickel-chromium-based superalloy, such as Inconel® 718.

An example of a fastener suitably employed in the practice of the embodiments herein is depicted in FIGS. 1-5. As shown in FIG. 1, a fastener assembly 100 comprises a fastener 110.

In an example, the coating assembly may be implemented with a fastener 110 of the type commonly used in an aircraft structure, one example of which may be a typical threaded bolt or stud 112 and a threaded nut 114 used in combination, for example, having an exterior coating system 500 as described herein (details of the coating system are shown schematically in FIG. 5, but it is understood that one or more of the fastener elements illustrated have part or all of their surfaces coated as described herein though their coating(s) are not visible in FIGS. 1-4 for ease of illustration). Referring to FIGS. 1 and 2, the bolt 112 comprises a shank 116 and a head 118 at one end of the shank and a threaded portion 120 at the other end of the shank. The bolt is all made of a solid metal in the present example, which may be of a type referred to above, and all or less than all of the entire surfaces of the bolt and nut may be coated by the coating system 500 described herein. The coating system 500 may also provide a lubricating effect, so as to reduce the galling effect between the respective threads of the bolt 112 and nut 114. Further as shown in FIG. 1, the fastener 100 may be used to secure together two components of an aircraft structure, such as first component 124 and second component 126 having aligned openings.

A stud or bolt 112 and mating part 114 assembly 100 such as illustrated in FIG. 1, or a fastener having a pulling stem and collar (not shown) are common fastener assemblies for a number of applications. In another alternative fastener assembly, the stud 112 can be passed axially into a sleeve 122 (FIGS. 3-4), for example configured so that the sleeve fits into aligned openings in the structures 124 and 126 alone with a clearance fit while the stud 112 is configured with the sleeve for an interference fit. Such a configuration, with the nut 114 or other locking component (not shown) may be suitable for use in composite structures, or composite and metallic structures to be secured together. In the configuration illustrated in FIGS. 3-4, the head 118 of the stud 112 provides a flush mounting and fits into a flared end 128 of the sleeve 122, though other stud and sleeve configurations can be used alternatively. The material and the geometry of the sleeve relative to the stud would be conventional, except for the possible use of coatings as described herein on one or more of the surfaces of the sleeve.

All exterior and interior surfaces or one or more parts of one or more of the fastener components or metallic components, including those described herein, can be coated with a coating system 500 to help in providing one or more of the benefits described herein, including but not limited to electrical conductivity, corrosion resistance, or decreased galvanic action between materials. The components illustrated in FIG. 1-4 can be understood to include coatings as described herein, on one or more surfaces, but representations of coatings are omitted for purposes of clarity in those Figures. An example of a coating system is illustrated schematically in FIG. 5, with representations of elements of the coating system exaggerated for visibility. The characteristics of exemplary coating systems can be understood from the discussion herein, including chemical compositions, thicknesses and other physical characteristics of the coating systems and their components. FIG. 5, which is an enlargement of the bolt 112, illustrates an example of a coating system having two layers 502, 504 applied to the external surface of the bolt 112. In one example, the first layer 502, also referred to as the conductive layer, is a highly conductive metallic layer applied to the metallic surface of the metallic component, in the present example one or more of the stud 112, nut 114 and/or the sleeve 122, and as illustrated in FIG. 5, to the external surface of the bolt. Typically, the conductive layer is a different material from the material of the base metal component. "Highly conductive" herein means the electrical resistivity is less than or equal to 1 mfg. The second layer 504 of the system in FIG. 5, also referred to as the resin based layer, is a resin composition containing conductive pigments 508. In one configuration, the first layer 502 consists of a nickel flash layer, and the second layer 504 comprises a resin composition 506 with conductive pigment 508, such as nickel fibers. These layers are shown schematically in FIG. 5, and are discussed more fully below. The resin composition 506 is illustrated schematically in FIG. 5 as forming the layer with the conductive pigment 508, but it should be understood that the resin composition identified by the reference number 506 as illustrated in FIG. 5 refers to not only the resin material but also any other components additional to the conductive pigment 508 making up the resin-based layer 504. Such other components may be any commonly used in binder formulations, such as corrosion inhibitors, lubricants such as polytetrafluoroethylene (PTFE), and plasticizers such as terephthalates, other polymers, and the like.

The conductive layer 502 can be applied as a nickel flash or strike. The nickel flash layer may be applied by being electrodeposited, although other forms of application or deposition may also be employed, such as electroless, brush, pasted, dipped, sprayed, printed, PVD (Physical Vapor Deposition), CVD (Chemical Vapor Deposition), or IVD (Ion Vapor Deposition). Other metals may also be employed in place of nickel, including, but not limited to, copper, zinc, tin, silver, lead, tin/lead, gold, and platinum. In an example, the nickel flash may be electrodeposited in a nickel sulfamate solution, according to SAE AMS-QQ-N-290 standard.

The resin composition 506 is a binder, commonly referred to as the vehicle, and is the actual film-forming component of the second layer 504. It imparts adhesion, binds the pigments 508 together, and influences properties such as gloss potential, durability, flexibility, and toughness.

A binder for the resin based layer 504 may be a phenolic resin. This is a thermoset resin, and provides chemical resistance. Phenolic resins are desired for fasteners because they are very hard and have a durable chemical resistance, which is useful, as they are often exposed to hydraulic fluids, oils, and the like. Phenolic resins are also very abrasion resistant, which is desirable for many fastener applications, especially for interference-fit applications. In some embodiments, phenol-formaldehyde resins may be used.

Additional components may be included in the resin composition, such as a secondary binder, which may be a thermoplastic, and/or other additives commonly used in binder formulations, such as corrosion inhibitors, lubricants such as polytetrafluoroethylene (PTFE), and plasticizers such as phthalates. For many applications, polytetrafluoroethylene may also be included in the resin composition as a non-metallic pigment. PTFE serves to lower the coefficient of friction. Other polymers that may be added that serve one or more of these functions include, but are not limited to, PEEK (polyether ether ketone), polyimides, PPS (polyphenylene sulfide), nylon and other polyamides, acetal (polyoxymethylene, POM), and polyesters, and their variants.

The conductive pigment 508 may be any low resistivity material, including a metal such as nickel, copper, silver, or aluminum, or a non-metal such as molybdenum disulfide or graphene. To minimize galvanic corrosion, the conductive layer 502 and the conductive pigment 508 may be the same metal. It was found that nickel produced more desirable results, for example for electrical conductivity, than other resin additives such as silver and graphene, and that nickel fiber produced more reliable results for electrical conductivity than nickel platelets and nickel spheres. Fortuitously, nickel, which is a low resistivity metal, is a superior combination, as it delays self-corrosion and galvanic corrosion.

In some embodiments, the ratio of the nickel pigment to the resin composition in the liquid state, also referred to as the liquid mixture, prior to being applied to the metal component, can range from about 5 percent by weight (wt %) to less than 15 wt % of the liquid mixture. In some embodiments, about 11 wt % may be the maximum concentration of the nickel pigment and about 9 wt % may be preferred. Where polytetrafluoroethylene is used, PTFE can range from about 1 wt % to about 10 wt % of the liquid mixture. In an embodiment, PTFE may be approximately 2 wt % of the liquid mixture. PTFE, nickel, and other components, such as corrosion inhibitors may contribute to CPVC (Critical Pigment Volume Concentration; see below), as they are not sintered into the coating during polymerization (the temperature is not high enough to make PTFE soluble). The amount of PTFE and/or other components, if added, contributes to the CPVC in addition to the nickel concentration.

In some embodiments, the concentration range of the nickel pigment is between about 9 wt % to about 11 wt % of the liquid mixture. Less than about 10 wt % typically does not have as high an electrical conductivity as may be desired in some applications. On the other hand, the electrical resistivity in the range of about 5 wt % to about 10 wt % is still below 10 mΩ, which may be acceptable in some applications.

At a concentration between about 14 wt % and about 15 wt % of the nickel pigment in the liquid mixture, the resin and pigment mixture can surpass the formulation stability (known as Critical Pigment Volume Concentration, CPVC). The CPVC is the point where there is just enough binder to fill the voids between the pigment particles; beyond this point, there may not be enough binder to fill the voids. The CPVC thus may limit the preferred upper value of the concentration of the pigment in the liquid mixture.

Figure 6A:
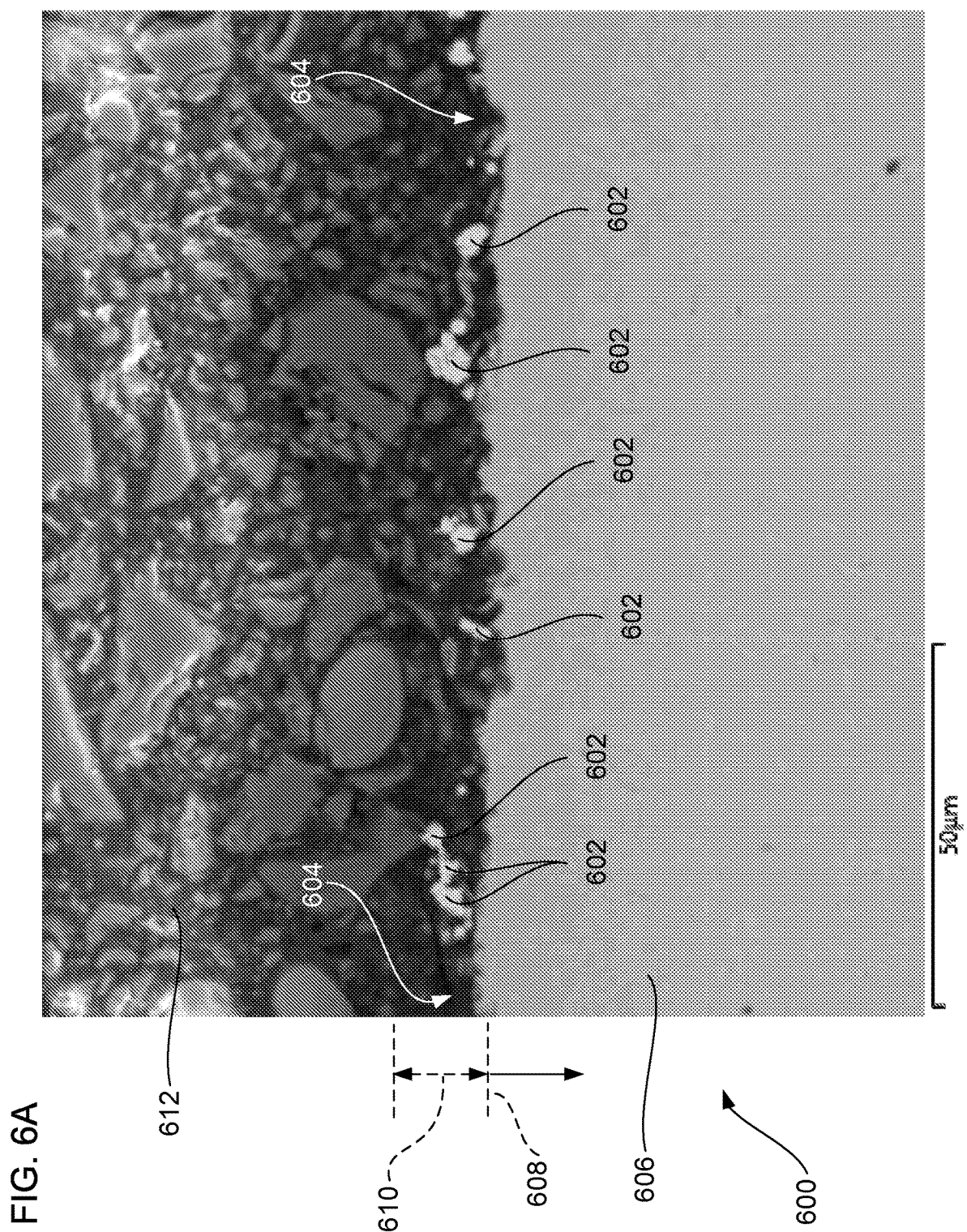
FIGS. 6A-6D are images of high resolution scans of components of the examples described herein.
Figure 6B:
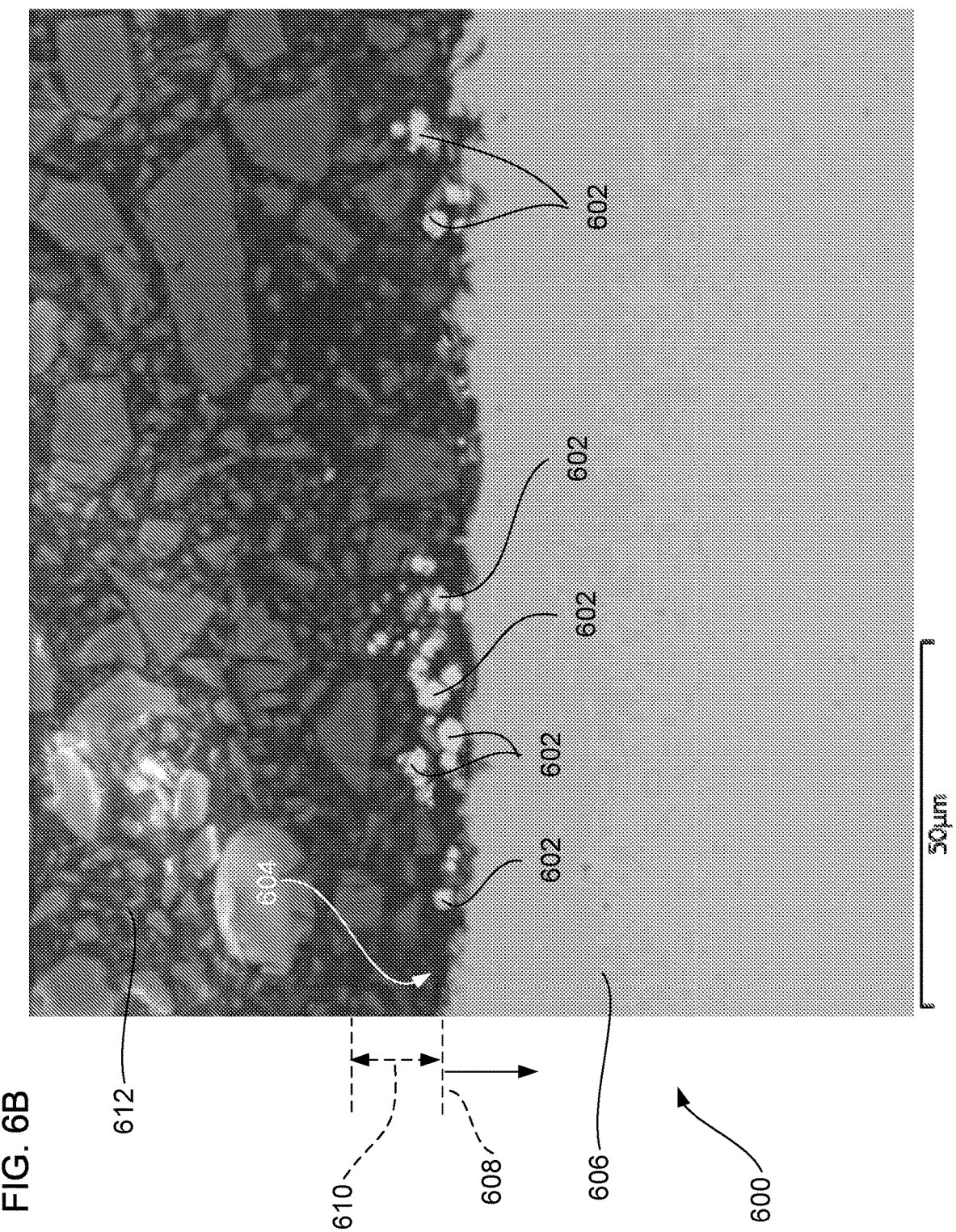

The conductive pigment 508 is advantageously nickel fibers randomly shaped, such as 525 Conductive Nickel Powder commercially available from Novamet Specialty Products Corp. (Lebanon, TN). Analysis of the nickel fiber pigmented resin based layer 504 showed that nickel fibers exhibited random three-dimensional clumping or agglomeration of nickel fibers, as depicted in FIG. 6. FIG. 6A shows an Energy Dispersive X-Ray Spectroscopy (EDS) from a scanning electron microscope of a cross section of a fastener 600 with only a nickel fiber 602 pigmented resin based layer 604 in which the nickel fiber is at 22.9 wt. % of the resin composition, and FIG. 6B shows a nickel fiber pigmented resin based layer 604 in which the nickel fiber is at 30.8 wt. % of the resin composition, demonstrating the randomness and the clumping or agglomeration. (New reference numbers are applied to these images as they show specific elements, and have characteristics identical to those same elements described herein.) These images show a portion of the titanium fastener 606 extending to a surface represented by dashed line 608 representing a varied surface revealed at the present magnification. The titanium surface 608 is directly covered by the resin based layer 604, having a thickness represented by the dashed line 610 representing a varied thickness over the titanium surface at the present magnification. The material 612 outside of the resin based layer 604 is a phenolic resin mounting support for the sample.

Figure 6C:
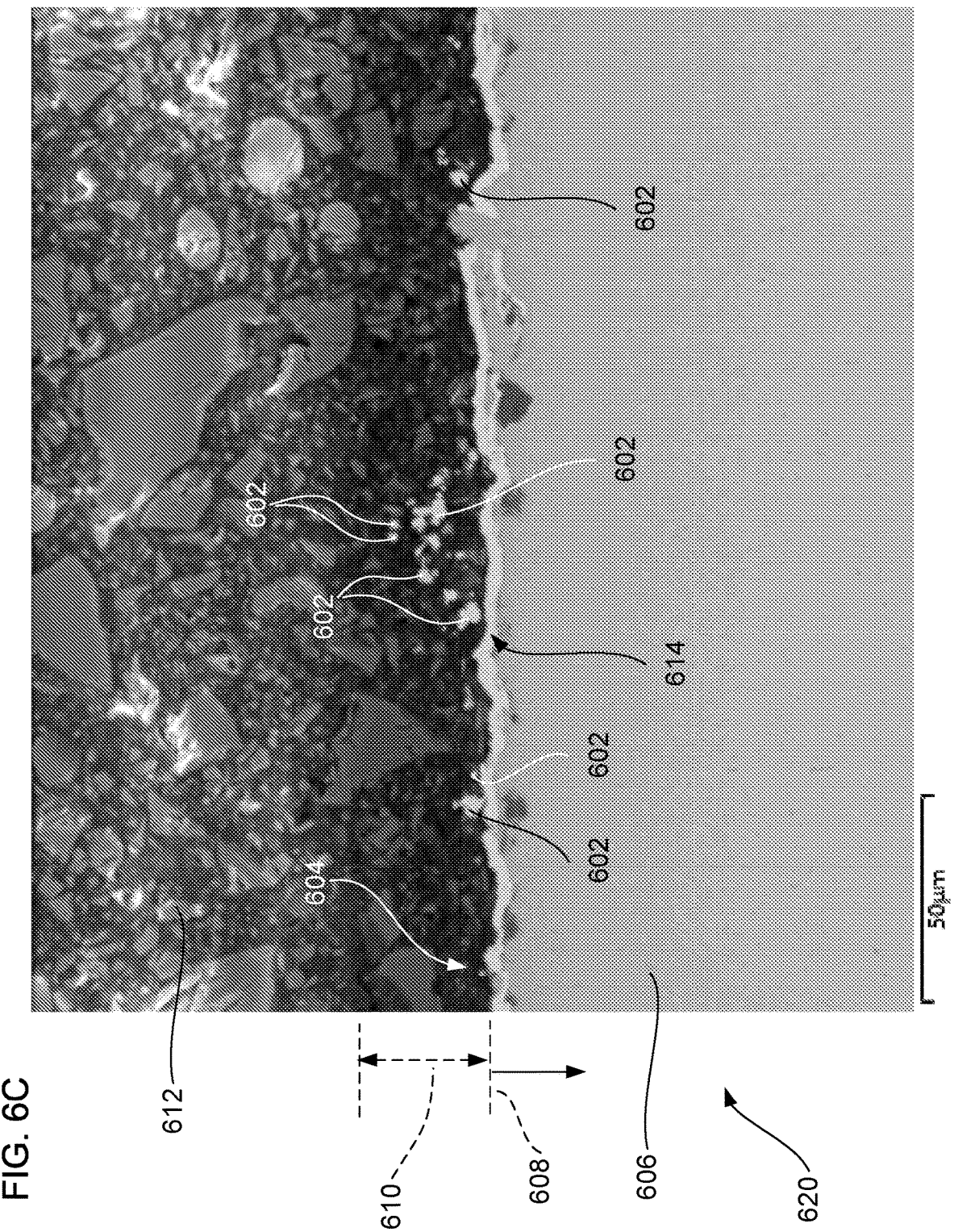
Figure 6D:
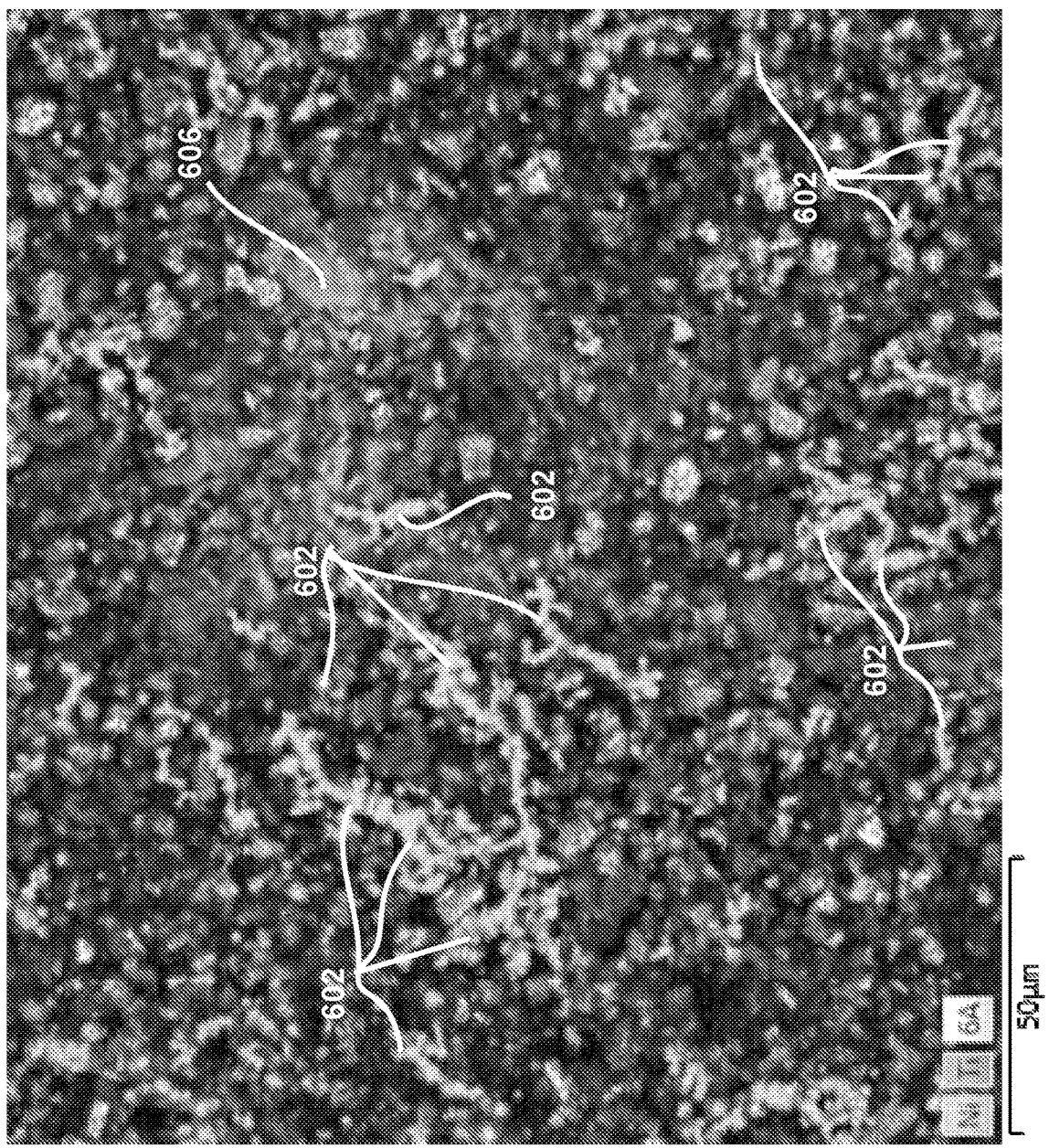

FIG. 6C is also an EDS from a scanning electron microscope of a cross section of a fastener 620 with a nickel flash layer 614 deposited on the bare metal surface of the fastener and a nickel fiber pigmented resin based layer 604 in which the nickel fiber is at 30.8 wt. % of the resin composition, shows a more continuous flash layer relative to the pigment distribution, the nickel flash being more uniformly distributed along the metal bare base surface 608 than the nickel pigment fiber, and showing the randomness and the clumping or agglomeration of nickel pigment. FIG. 6D shows an EDS from a scanning electron microscope of a plan view of a bare fastener 630 with only a nickel fiber pigmented resin based coating 604 in which the nickel fiber is at 22.9 wt. % of the resin composition with some of the fastener surface revealed in the scan through the resin based coating 604. The view also demonstrates the randomness and the clumping or agglomeration of the nickel fibers 602 in the resin based layer 604. The nickel pigment 508 has a branch-like structure that may be substantially randomly dispersed in the resin composition 506. The branch-like structure provides beneficial 3D-agglomerates randomly distributed in the resin composition, some being in contact with the conductive layer, others extending only partially in the direction normal to the conductive layer 502, such as to form 3D-networks that are electrically conductive.

Nickel is the best performing material that was tested. It has good corrosion resistance and electrical conductivity. It is a ferromagnetic material, which can be useful in some applications. Nickel pigments also showed an affinity to be highly suitable in a liquid mixture such as a solvent based system. Just as important as nickel as an element, the fibrous and/or filamentary morphologies allowed for an acceptable coating thickness (5 µm to 20 µm). Nickel is extremely resistant to oxidation, which allowed for maintaining electrical conductivity even in salt spray over time. These morphologies allow for percolation (networking formation) and promote electrical current in a percentage low enough for its concentration in the resin composition (once dried) to be below CPVC yet still promote conductivity for electrical bonding and electrical grounding.

Fibrous and/or filamentary nickel pigment 508 may intertwine in three dimensions when dispersed in the resin composition 506. The randomly spatial orientation and entanglement of the pigments is beneficial and useful for the electrical conductivity desired for performance. When coupled with the nickel flash, the nickel fiber allows a pigmented coating below CPVC but still within electrical bonding and electrical grounding requirements.

The nickel fiber 508 may average about 20 µm in length, with the length ranging from about 1.4 µm to about 88 µm. The diameter of the nickel fiber 508 may average about 2 µm, with the diameter ranging from about 0.5 µm to about 10 µm.

The total thickness of the combination of the conductive layer 502 and resin-based layer 504 may range from about 5 µm to about 20 µm, with the conductive layer having a thickness of less than 2.5 µm and the resin-based layer 504 having a thickness comprising the remainder. This total thickness range is considered to be an acceptable coating dimensional offset for fasteners. The thickness ranges for the conductive layer 502 and the resin-based layer 504 for other aerospace components such as fasteners may be of somewhat different thicknesses, depending on their particular use in conjunction with such aerospace component, consistent with what is conventional for that use.

Figure 7:
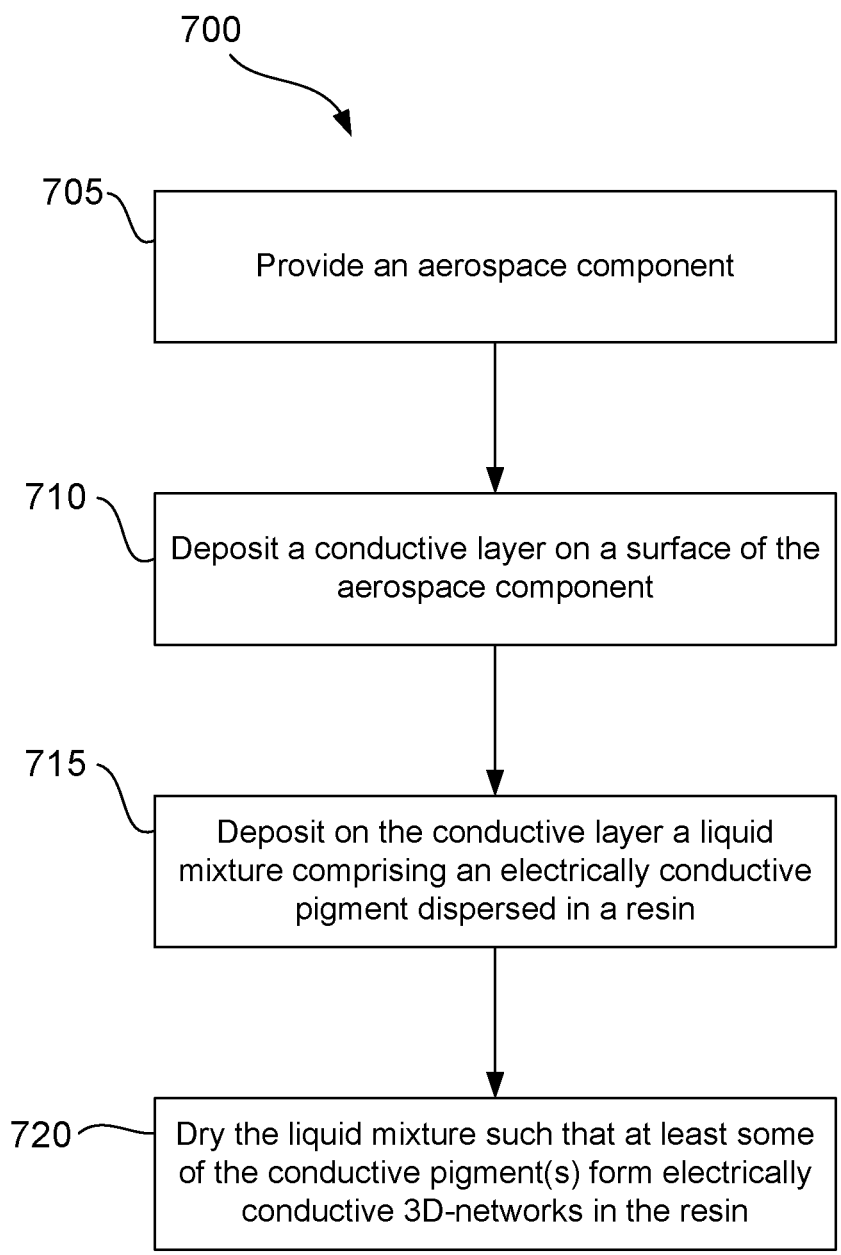
FIG. 7 is a flow chart of a method of coating an aerospace component, according to an embodiment consistent with the principles described herein.

In accordance with embodiments of principles described herein, a method for coating the aerospace component 110 with the coating system 500 is provided. FIG. 7 illustrates a flow chart of the method 700, which includes providing 705 the aerospace component. The aerospace component 110 can be any of the aerospace components listed above, including fasteners such as pins, bolts, collars, nuts and nut plates, washers, and studs, for example. The aerospace component 110 may be formed from a base metal selected from the group consisting of titanium or titanium alloy, such as Ti-6Al-4V, a stainless steel, such as A286, and a nickel-chromium-based superalloy.

The method 700 further includes depositing 710 the conductive layer 502 on a surface of the aerospace component 100. The surface can be bare metal, metal with an anodized surface, or a machined, blasted or otherwise mechanically prepared surface. In an embodiment, the conductive layer 502 is a nickel flash layer deposited on the surface of the aerospace component. The nickel flash 502 may be electrodeposited on the surface of the aerospace component.

The method 700 further includes depositing 715 a liquid mixture comprising the resin and the electrically conductive pigment 508 on the conductive layer 502 to form the resin-based layer 504 containing the conductive pigment.

The conductive pigment 508 is suspended in the resin, which is dissolved in a volatile solvent, giving the mixture a liquid consistency but providing fast drying after application. For example, the pigments 508 may be milled into the resin according to conventional milling techniques.

The liquid mixture may be mixed thoroughly and uniformly in the solvent according to conventional paint mixing techniques. The solvent may be a lower molecular weight alkyl alcohol such as methyl, ethyl, propyl or isopropyl alcohol or a similar solvent such as methyl ethyl ketone or a petroleum distillate in the volatile solvent range such as xylene or toluene, or mixtures of two or more of these solvents. The amount of solvent used may be sufficient to provide a desired degree of liquidity, depending somewhat on whether it is to be applied by spraying, dipping or brushing, or the like.

In some embodiments, the liquid mixture may be applied by spraying, although either dipping or brushing can be used instead. Because of the volatility of the solvent, it dries and solidifies quickly. The aerospace component may be dried 720, such as by heating, after application in order to drive off solvents and form the solid resin-based layer 504 with the 3D-agglomerates of nickel fibers 508 randomly distributed in the resin composition 506. Heating can be according to conventional methods at temperatures and times sufficient to yield the desired results, for example with the desired cross-linking. Temperatures may be between approximately 150° C. to 205° C. for the desired time, which may be approximately 1 hour, for example.

The thickness of the coating system 500 once solidified on the fastener is advantageously between about 5 μm and about 20 μm. This thickness control is desirable, particularly in the case of threaded fasteners, to ensure proper thread fit and in the case of aircraft, quality interference or non-interference type fasteners. Interference-fit fasteners are commonly made with their diameters slightly greater than that of the hole through the structural member to which it is to be fastened. Forcing such a fastener part through a hole for the fastener part typically causes abrasion of the coated surface of the fastener part, and can damage the surface of the hole and surrounding work piece structures through which the fastener part is forced. It has been found that the coating system 500 applied according to these inventions may be capable of lubricating the fastener part 110 to avoid coating degradation and assist in maintaining adherence of the coating to the fastener part. For example, such coating system 500 sustains 34,000 N of installation forces and meets the requirements of the EN4473 standard.

In order for the conductive pigment 508 to be randomly spatially dispersed in the liquid mixture, it may be initially placed in a surfactant, such as Anti-Terra-U, a wetting and dispersing additive that is a solution of a salt of unsaturated polyamine amides and low-molecular acidic polyesters available from BYK (Austin, TX), and/or EFKA 7500, a modified polyether that improves dispersion or suspension stability and is available from BASF (Florham Park, NJ). The conductive pigment 508 with surfactant may then be placed into the resin under mechanical shear, such as milling, as described above.

The prior art recommends against electroplating titanium fasteners for aerospace applications because titanium is highly susceptible to hydrogen and oxygen pick-up. This can easily cause embrittlement of the titanium or cause stress cracks. Electroplating is typically performed with chlorine-based hydrochloric add, which is banned in aerospace applications. There are examples outside of aerospace where titanium is electroplated for the purpose of adding solderability, improving corrosion resistance in hot acidic environments, adding lubricity and improving anti-galling properties. Yet, the conductive layer 502 employed herein, which can utilize electroplating, apparently is of short enough duration that hydrogen and oxygen pick-up are minimized or even eliminated.

Some materials such as titanium, stainless steel and nickel based alloys naturally passivate (a thin oxide film forms on the surface when the oxide-free surface comes into contact with air or water), and thus adhesion of electroplating is not possible without overcoming this tenacious oxide film. The plating industry has developed a method of flashing such metals with materials, for example nickel or copper to overcome the passivation oxide layer and to allow for adhesion of a subsequent final electroplating layer, for example gold.

Utilizing nickel flash as a base for the resin-based layer 504 is counterintuitive. A nickel flash is normally intended for overcoming the passivating film to allow for subsequent electroplating adhesion; it is unknown for a nickel flash to be performed prior to placing a resin-based layer on a metal-based component, such as a fastener, made of titanium, stainless steel or nickel alloy. It does not promote adhesion of a resin-based layer and has no functional purpose to be considered before coating. Coatings are usually intended to be directly coated on the fastener substrate, and if adhesion promotion is required, this is ordinarily done by means of chemical or mechanical surface preparation such as sand blasting or a base paint such as primer, not a nickel flash.

The resin-based layer 504 may be formed on titanium fasteners. Titanium itself is metallic and provides high electrical conductivity. The conductive layer 502, also being metallic is also highly electrically conductive. To be able to attain the electrical conductivity of a metallic coating, a resin-based layer could not ordinarily match this performance without surpassing the coating CPVC. However, when coupled with the conductive layer 502 on the titanium, there is an unexpected increase in electrical conductivity by the combination of both layers 502 and 504 that lowers the electrical resistivity of the coating system 500 far below the resistivity of the resin based layer. While both the conductive layer 502 and the resin-based layer 504 are finishes, it is counterintuitive to combine both to achieve enhanced electrical conductivity on a metallic substrate. The net effect is unexpected and allows the desirably high conductivity (low resistivity) of electrical bonding and electrical grounding, yet maintains the resin barrier effects of fuel/chemical resistance, galvanic corrosion protection to allow material compatibility and low friction to aid in high interference installation as well as in torque-tension.

The coating system 500 may be applied on the entire surface of a metal component, or may be applied only partially. For instance, if the component is the fastener assembly 100, the top surface of the head 118 can be bare while the full surface of the shank 116 and the threaded portion 118 can be covered with the coating system 500. In another example, the head 118 and an adjacent annular portion of the shank 116 can be bare, the rest of the shank 116 surface and the threaded portion 118 being covered with the coating system 500. In another example, the shank 116 of the bolt and/or the internal and/or external surfaces of the sleeve 122 can be coated with two, three, four or more longitudinal stripes, or one, two or more annular bands, or any other shape.

The portion of the base metal being covered by the coating system 500 may be at least 50 percent of the entire surface of the component, or may be at least 60 percent of the entire surface of the component, or may be at least 70 percent of the entire surface of the component, or may be at least 80 percent of the entire surface of the component.

The coating system 500 may also be covered with a third lubricious layer with a low adherence, which decreases the coefficient of friction of the fastener assembly during installation in a structure hole. For instance, this third lubricious layer may be grease, cetyl alcohol, or a coating described in patent application Serial Number U.S. Ser. No. 16/742,274, published as US2020/0149566 (incorporated by reference). It has been found that such lubricious layer with a low adherence does not impair the electrical conductivity of the coating system 500 as the lubricious layer is at least partially stripped during interference installation of the fastener.

The third lubricious layer may be applied on the entire surface of a metal component, or may be applied only partially. It may be applied on portions which are not covered by the coating system 500, it may be applied on the full surface coated with the coating system 500, or it may be applied partially on the surfaces covered by the coating system 500.

EXAMPLES

Example 1

Several titanium-based fasteners 112 were coated with the coating system 500. The fasteners consisted of Ti-6Al-4V alloy. The first layer 502 was a nickel flash layer, formed by nickel that was electroplated onto the titanium via the nickel sulfamate process, following the SAE AMS-QQ-N-290 standard.

Following the deposition of the nickel flash layer on the fasteners, the nickel-covered surfaces were then abrasively blasted to promote mechanical adhesion of the resin based layer 504. The second layer 504 was a phenol-formaldehyde resin composition 506 in which nickel pigment 508 was dispersed. The phenol-formaldehyde resin composition also included common components, for example solvents, PTFE, corrosion inhibitors, and plasticizers. The resin composition was then sprayed directly onto the abrasive-blasted nickel flash layer. The coating was then cross-link polymerized by heating the aerospace component at 204° C. for one hour. The nickel pigment was nickel fiber 508, of 20 μm average length and 2 μm average diameter. Various concentrations of the nickel fiber in the resin composition were employed, as set forth in Table I below. It is noted that the concentrations discussed in the Examples herein of nickel fibers in the resin composition was based on the resin composition in the liquid state (wet), prior to polymerization, while the Table 1 below also lists the equivalent dry concentration by weight for purposes of considering the final product that would be used in a fastener assembly such as that illustrated in FIGS. 1-5.

Figure 8:
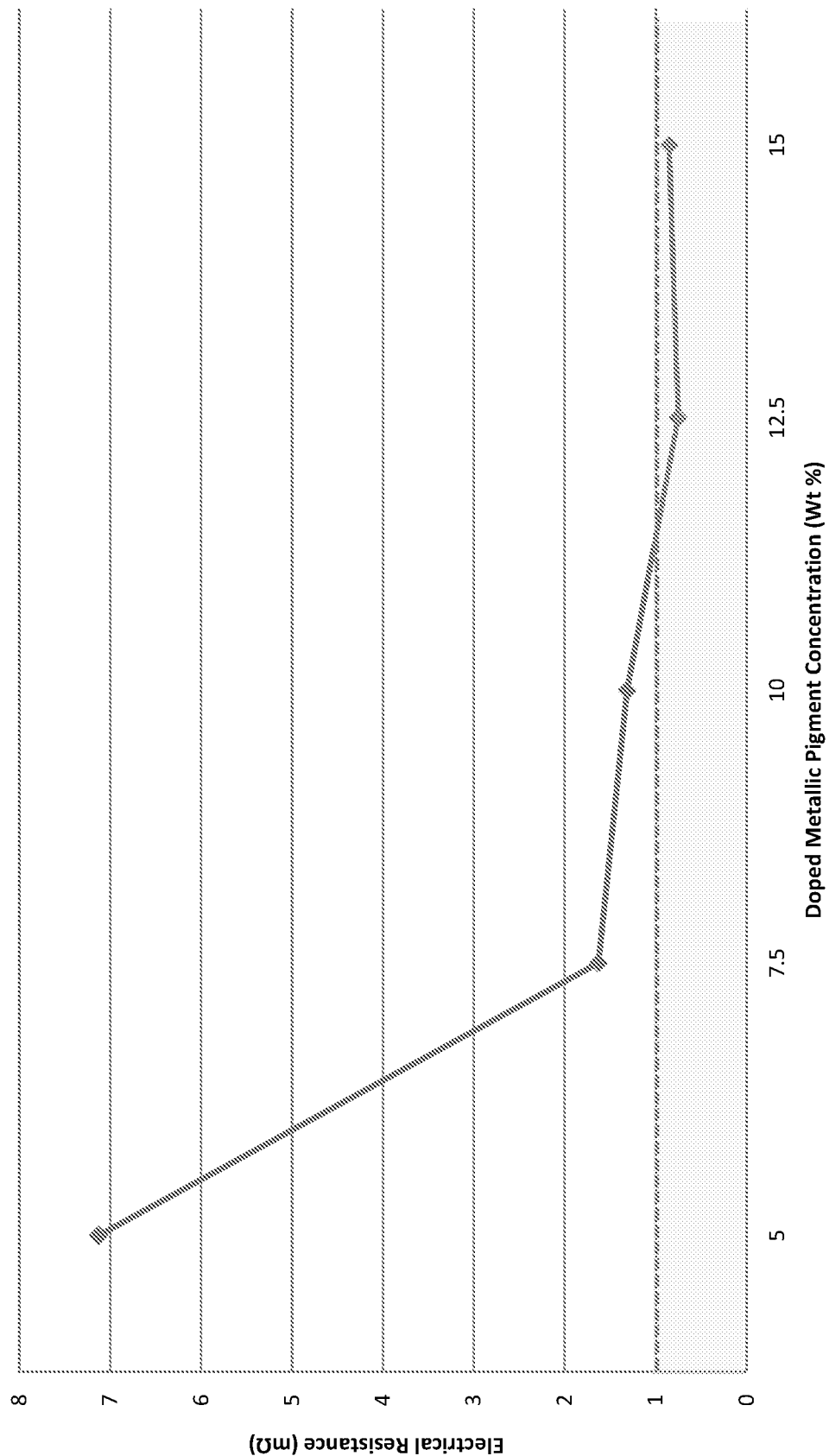
FIG. 8, on coordinates of resistance (in milliohms) and concentration (in weight percent), is a plot of the resistance of a fastener having a nickel flash layer and a nickel-pigmented resin layer as a function of pigment concentration, according to an embodiment consistent with the principles described herein.

The electrical resistance of each coated fastener 112 was measured. The fasteners were installed in an aluminum coupon in clearance. This allowed the countersink of the fastener head and coupon countersink to seat flush with each other. The top of the head of the fastener was stripped to create a path into the fastener and a kelvin probe contacted there. An electrical connector was attached to the coupon. The resistance was measured with an ATEQ AX6000 4-point milliohmmeter. The results are listed in Table I and plotted in FIG. 8. The second column is the nickel pigment concentration in the liquid mixture, the third column is the nickel pigment concentration in the resin composition, once the solvent of the liquid mixture has been evaporated, and the fourth column shows the electrical resistivity of each fastener:

TABLE I

| Example No. | Ni Pigment Concentration Wet, wt % | Ni Pigment Concentration Dry/Crosslinked, wt % | Electrical Resistivity, mΩ |
| --- | --- | --- | --- |
| 1A | 4.7 | 12.9 | 7.1 |
| 1B | 6.9 | 18.2 | 1.6 |
| 1C | 9.0 | 22.9 | 1.2 |
| 1D | 11.0 | 27.1 | 0.8 |
| 1E | 13.0 | 30.8 | 0.9 |

Networking of pigments started at about 6.9 wt % concentration of nickel pigment in the liquid mixture. The best performance was at about 11 wt % nickel pigment, falling to less than 1 milliohm in electrical resistance. About 13 wt % nickel pigment was also less than 1 milliohm, but the liquid formulation exceeded what was considered desirable, due to exceeding the critical pigment volume concentration.

It is noted that although a concentration of about 4.7 wt % of nickel pigment had an electrical resistivity of 7.1 mΩ, that value is still less than 10 mΩ, which may be acceptable in certain applications.

Example 2

Figure 9:
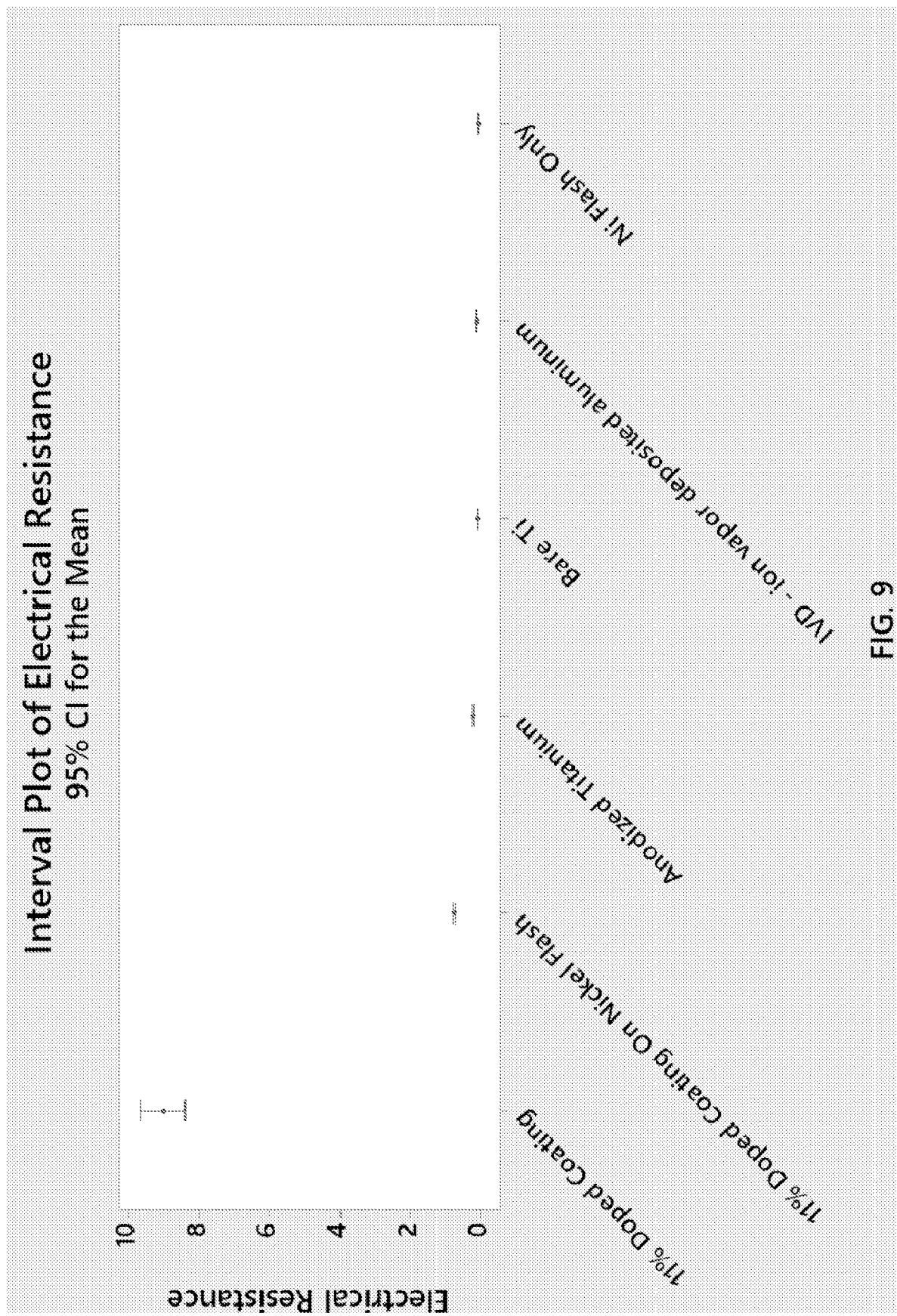
FIG. 9 is an interval plot of the resistivity (in milliohms) of various coatings, including a coating of the present inventions for comparison, according to an embodiment consistent with the principles described herein.

A comparison was made between a fastener 112 having the two-layered coating system 500 as described above and other coated and non-coated fasteners. The results are listed in Table II and plotted in FIG. 9. Examples 2C in Table II are a coating system within an example of the inventions.

TABLE II

| Example No. | Coating | Electrical Resistivity, mΩ |
|---|---|---|
| 2A | Resin-based coating only on bare titanium | 38-55 |
| 2B | Nickel-based resin layer only, 11 wt % resin composition, on bare titanium | 16-25 |
| 2C1 | Nickel-based resin layer, 11 wt % resin composition + nickel flash on bare titanium (nickel flash thickness 2-3 μm, overall thickness 6-15 μm) | 0.8 |
| 2C2 | Nickel-based resin layer, 11 wt % resin composition + nickel flash on bare titanium (nickel flash thickness 1-2 μm, overall thickness 5-15 μm) | 0.2 -.05 |
| 2D | Sulfuric Acid Anodizing (SAA) | 0.2 |
| 2E | Nickel flash layer only on bare titanium | 0.1 |
| 2F | Bare titanium alloy | 0.1 |
| 2G | Ion-Vapor Deposited Aluminum (IVD) | 0.1 |

For electrical bonding, the general requirement is to be below 10 mΩ; for electrical grounding, the requirement is to be below 1 mΩ. All the pure metallic platings 2E and 2G are below both requirements, whereas the resin-based coating 2A is in the 35 to 55 mΩ range. The nickel-based resin layer 2B with 11 wt % nickel fibers only (concentration in liquid mixture) is approximately 16 mΩ average. The nickel-based resin layer with about 11 wt % nickel fibers 508 (concentration in liquid mixture) combined with the nickel flash 502 (Examples 2C1 and 2C2, the coating systems 500 disclosed and included in a claim herein) falls below the 10 mΩ threshold and has an electrical resistance mimicking the pure metal platings in the electrical grounding range. Surprisingly, a thinner nickel flash 502 layer lowers the overall electrical resistivity of the coating system 500 below 0.5 mΩ (Example 2C2). The SAA treatment 2D and the IVD coating 2G are considered less desirable as electrical bonding and electrical grounding coatings for the reasons given earlier. Bare titanium 2F would not be acceptable, since it would lead to galvanic corrosion in aluminum structures. A nickel flash alone 2E would not be acceptable for the same reason.

Although the coating systems described herein have been described with particular reference to use as coating systems for fasteners, the coating systems are not limited to fasteners but may be applied generally to other surfaces, in particular, aerospace components where low electrical conductivity is desirable, as well as corrosion protection and lubrication, such as titanium and titanium alloys, high-temperature tool steel or other parts made of alloy steel, and superalloys. Likewise it is not always necessary to apply coatings as thin as those which will ordinarily be applied to fasteners, and thicker coatings may be used for other applications.

It will be apparent from the foregoing that while particular forms of the inventions have been illustrated and described, various modifications can be made without departing from the spirit and scope of the invention. Accordingly, it is not intended that the inventions be limited, except as by the appended claims.

What is claimed is:

1. A method for coating a metal component comprising a base metal, the method comprising:
   providing the metal component;
   depositing a conductive layer on a surface of the metal component;
   depositing a liquid mixture comprising electrically conductive pigments dispersed in a resin on the conductive layer, and
   drying the liquid mixture to form a resin based-layer, such that the conductive pigments form electrically conductive 3D-networks in the resin based layer, such networks being randomly distributed in the resin based layer.

2. The method according to claim 1, wherein the conductive layer is a nickel flash deposited on the surface of the metal component.

3. The method according to claim 2, wherein the nickel flash is electrodeposited on the surface of the metal component.

4. The method according to claim 1, wherein the liquid mixture is deposited on the conductive layer by spraying.

5. The method according to claim 1 wherein the pigments are nickel fibers and a concentration of nickel fibers in the liquid mixture is within a range of about 5 wt % to less than 15 wt %.

* * * * *